March 13, 1956   J. N. LOUGHNER   2,738,206
TRAILER HITCH WITH VERTICALLY SPACED CONNECTIONS
Filed Dec. 10, 1952
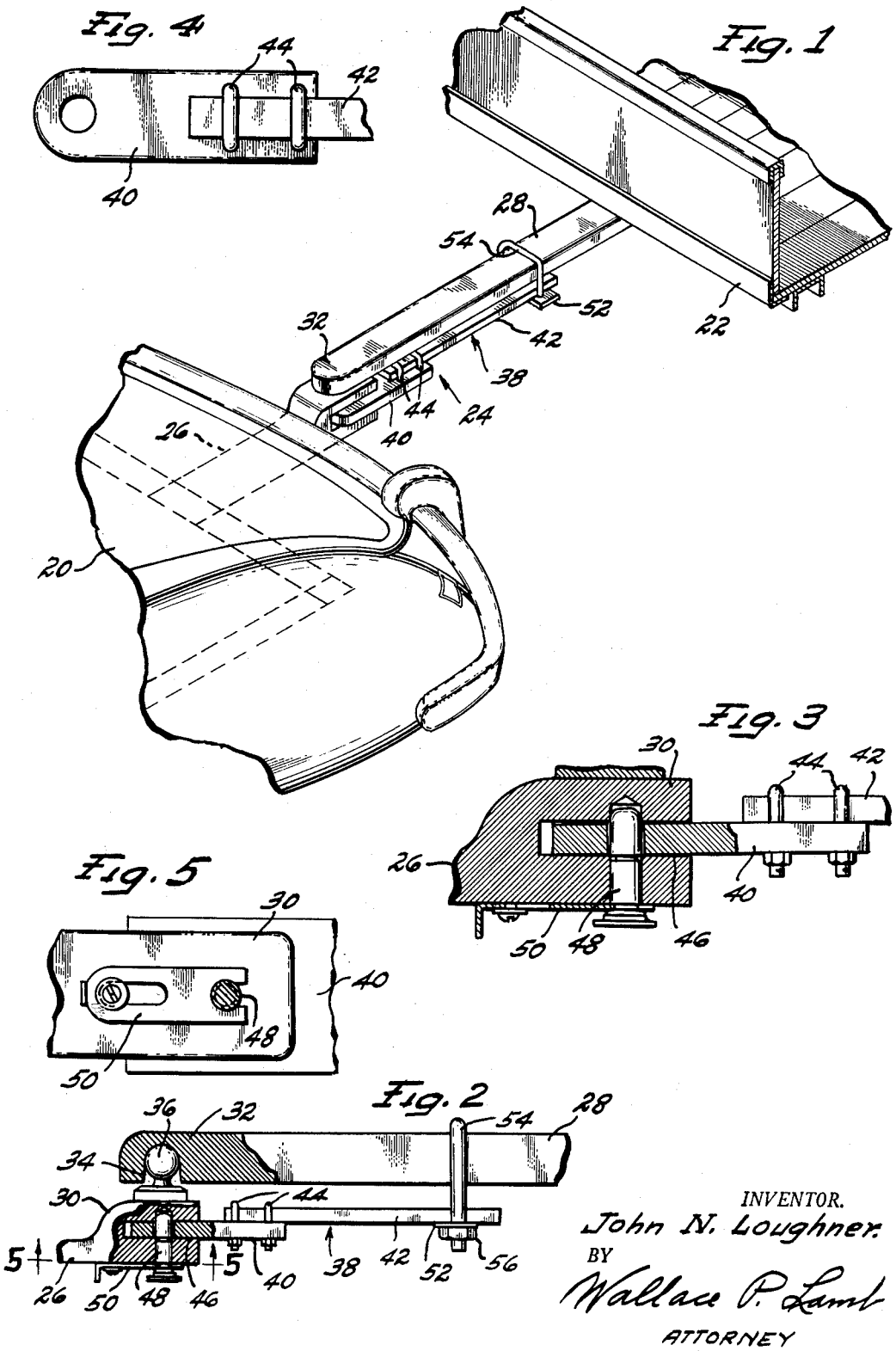
INVENTOR.
John N. Loughner
BY
Wallace P. Lamb
ATTORNEY United States Patent Office 2,738,206
Patented Mar. 13, 1956

2,738,206

TRAILER HITCH WITH VERTICALLY SPACED CONNECTIONS

John N. Loughner, Detroit, Mich.

Application December 10, 1952, Serial No. 325,170

1 Claim. (Cl. 280—461)

This invention relates generally to tractor-trailer vehicles and particularly to hitches therefor.

One of the objects of my invention is to provide for a hitch having a trailer-loaded spring acting to decrease trailer weight on the tractor and to hold an otherwise releasable draft coupling together, an improved connection between the spring and coupling including a tilt pad bearing acted on by the spring.

Another object of the invention is to provide an improved arrangement of the draft coupling members including a tilt pad bearing to effect quick release of the coupling and/or quick coupling of the vehicles.

Another object of my invention is to provide an improved lever arm thrust member and bearing which is removable as a unitary structure from the coupling to effect uncoupling of the vehicles.

Other objects of the invention will become apparent from the following detail description taken in connection with the accompanying drawings in which:

Fig. 1 is an isometric view of portions of a tractor-trailer unit coupled together by my improved hitch;

Fig. 2 is a side elevational view of my hitch with parts broken away and in section;

Fig. 3 is an enlarged fragmentary side view of my hitch;

Fig. 4 is a plan view of a detail of my hitch and,

Fig. 5 is a bottom view taken in the direction of the arrows 5—5 of Fig. 2 showing a quick release detail of my hitch.

Referring to the drawings by characters of reference, Fig. 1 illustrates a tractor or motor vehicle 20, a trailer 22 and my improved hitch 24. The trailer 22 may be a so-called utility trailer or house trailer or any trailer, usually two wheeled, in which the trailer load is partially carried by the rear springs of the tractor since my hitch 24 is particularly adapted for hitching such trailers to tractors.

The tractor carries a rearwardly projecting support and draft bar 26 to receive and support part of the trailer and its load by way of a support or draw bar 28 on the front end of the trailer. Tractor support 26 and trailer draw bar 28 may be respectively and rigidly secured to the frames (not shown) of the vehicles. In coupled position, a rear end portion 30 of the tractor support 26 overlaps a front end portion 32 of the trailer draft bar 28. On the front end portion 32 of the trailer draft bar 28 is a downwardly facing socket 34 which receives an upstanding ball coupling member 36 that is rigidly secured to the rear portion 30 of the tractor draft bar 26. Thus, the ball and socket draft coupling affords substantially universal movement between the trailer and tractor draw bars 26, 28. Uncoupling may be readily accomplished by lifting the trailer draw bar 28 upward off the coupling ball 36.

To decrease the effective trailer load on the tractor, I provide a lever extension 38 for the tractor draft bar 26 to increase the lever arm of the bar and apply a force through extension 38 on trailer draft bar 28 at a point to decrease the lever arm of bar 28 whereby to gain an upward thrust through the draft coupling members 34, 36 against the trailer load. The upward thrust gained by changing the lever arms of the tractor and trailer draft bars also acts to hold the coupling members 34, 36 together against accidental uncoupling.

In order to provide an efficient lever extension 38 with respect to bearing thrust and also one which may be readily removed to allow convenient uncoupling of the vehicles, I make the extension of composite construction comprising a bearing tilt pad 40 and a leaf spring 42. The extension 38 extends longitudinally beneath the trailer draw bar 28; the pad 40 being connected to the rear end of tractor draw bar 26 and the spring 42 acting against the trailer draw bar 28 at a point rearwardly of the coupling members 34, 36. The forward end of spring 42 may be secured to the tilt pad 40 by U-bolts 44 or by any other suitable means. In the rear end of the tractor draw bar 26 is formed a socket or clevis 46 to receive loosely the tilt pad 40 which is pivoted thereto for horizontal movement by a vertical pin 48. A quick release clip 50 is pivoted to the underside of the clevis 46 to hold the pin 40 up in locking position; the pin upon release by the clip being readily removable to release the extension. The rear end of the spring 42 is free and has a flat contiguous bearing surface which rests on a cross bar 52 on the trailer draw bar 28. The cross bar 52 may be secured by U-bolts 54 and nuts 56 threaded thereon against the underside of the cross bar 52 to secure the bar to the trailer frame. By the term "free" is meant that the rear end of the spring 42 is unattached. This permits movement of the spring rear end on the cross bar 52 longitudinally of the trailer or in the direction of trailer travel and also facilitates ready removal of the spring. It is to be understood that pin 48 is a locating means and has no coupling function. For different trailer loads, tension of spring 42 may be changed by means of nuts 56 to obtain practically level position or alignment of the draw bars 26, 28 for smooth swivel action therebetween.

When the vehicles are coupled together and traveling along a road, it will be appreciated, that the aligned draft bars will effect smooth articulated action in horizontal planes, as the tilt pad 42 will pivot substantially freely about pin 48 while at the same time transmit the spring force upwardly against the end of trailer draft bar 28. When bumps or other road irregularities are encountered by the vehicles, the spring 42 acts to dampen vibrations and permits restricted lever action of the trailer draft bar 28, vertically holds the coupling members 34, 36 together against accidental uncoupling.

From the foregoing description, it will now be understood that I have provided an improved tractor-trailer hitch in which an upward thrust is effected on the trailer load at the coupling members whereby to decrease the effective load on the tractor springs by more equally distributing the trailer load on the trailer wheels. It will also be understood that I have provided in a hitch of the above mentioned character for transmitting the said upward thrust through a tilt pad to effect a good bearing with the tractor draft bar. Further, the vehicles may be easily and readily unhitched by releasing and removing the locking pin after which the lever arm extension may be moved laterally to disengage the tilt pad from the draft bar clevis. It is to be understood that to remove the lever extension 38, it is necessary to lift the tongue of the trailer which is customarily done with a jack. Since the free end of spring 42 is unattached to bar 52, the extension as a unit may be removed and the trailer draft bar 28 then may be lifted clear of the coupling ball 36. In addition I have provided in the use of the tilt pad an inexpensive hitch since said pad may be readily produced from flat stock.

While I have shown and described my invention in detail and in connection with a so-called trailer, it is to be understood that the invention may be used on other vehicles such as farm machinery, trailers, etc. and therefor the invention is to be limited only by the scope of the appended claim.

I claim:

A hitch for connecting together a tractor and trailer comprising, a tractor drawbar having a rear end formed with vertically spaced upper and lower clevis components presenting flat opposed surfaces, a spherical coupling member secured to and above the upper clevis component, a trailer drawbar having a downwardly facing socket receiving said spherical coupling member to form therewith an articulated draft coupling, a single leaf spring disposed directly below said trailer drawbar extending longitudinally thereof, said spring having a free rear end acting downwardly against and slidably longitudinally of said trailer drawbar and arranged to counterbalance the trailer load on the tractor drawbar, a tilt plate attached rigidly to the forward end of said spring and loosely engaging in said clevis for limited vertical tilting movement relative thereto, a pin extending upwardly through the clevis components and tilt plate having clearance with the latter to allow said tilting movement, said pin being movable downwardly to release said clevis, and tilt plate, and a quick release member on the lower clevis component holding said pin in its up position.

References Cited in the file of this patent

UNITED STATES PATENTS

| | | |
|---|---|---|
| 1,155,062 | Heisler | Sept. 28, 1915 |
| 2,453,941 | Smit | Nov. 16, 1948 |
| 2,517,047 | Spitler | Aug. 1, 1950 |
| 2,559,103 | Anderson | July 3, 1951 |
| 2,614,861 | Van Horn | Oct. 21, 1952 |
| 2,643,891 | Mosley | June 30, 1953 |